United States Patent
Rinne et al.

(10) Patent No.: US 8,901,903 B2
(45) Date of Patent: Dec. 2, 2014

(54) DIGITAL STRESS SHARE METHOD

(75) Inventors: Karl Rinne, Yougal (IE); Anthony Kelly, Old Kildimo (IE); Eamon O'Malley, Claremorris (IE)

(73) Assignee: Powervation Limited, Castletroy, Co. Limerick (IE)

(*) Notice: Subject to any disclaimer, the term of this patent is extended or adjusted under 35 U.S.C. 154(b) by 346 days.

(21) Appl. No.: 13/378,636

(22) PCT Filed: Jun. 15, 2010

(86) PCT No.: PCT/EP2010/058419
§ 371 (c)(1),
(2), (4) Date: Mar. 15, 2012

(87) PCT Pub. No.: WO2010/146068
PCT Pub. Date: Dec. 23, 2010

(65) Prior Publication Data
US 2012/0163429 A1    Jun. 28, 2012

Related U.S. Application Data

(60) Provisional application No. 61/262,910, filed on Nov. 19, 2009.

(30) Foreign Application Priority Data

Jun. 15, 2009 (GB) .................... 0910233.6

(51) Int. Cl.
*H02M 1/084* (2006.01)
*H02M 3/157* (2006.01)
*H02M 3/158* (2006.01)
*H02M 1/00* (2006.01)

(52) U.S. Cl.
CPC ............ *H02M 3/157* (2013.01); *H02M 3/1584* (2013.01); *H02M 2001/0012* (2013.01); *H02M 2003/1586* (2013.01)

USPC .......................................... 323/272

(58) Field of Classification Search
CPC ............. H02M 1/084; H02M 1/0845; H02M 2003/1586
USPC .......................................... 323/272
See application file for complete search history.

(56) References Cited

U.S. PATENT DOCUMENTS 4,924,170 A    5/1990    Henze
7,235,957 B2*    6/2007    Yang .............................. 323/272

(Continued)

FOREIGN PATENT DOCUMENTS

WO    WO2009010476 A1    1/2009

OTHER PUBLICATIONS

European Patent Office, The International Bureau of WIPO, International Preliminary Report on Patentability; Written Opinion of the ISA dated Dec. 29, 2011 for International Application No. PCT/EP2010/058419, filed Jun. 15, 2010, 10 pages.

(Continued)

*Primary Examiner* — Harry Behm
(74) *Attorney, Agent, or Firm* — Hickman Palermo Truong Becker Bingham Wong LLP; Edward A. Becker (57) ABSTRACT

The Application is directed at arrangements at which switch mode power converters share a common load. More particularly, the application provides a masterless arrangement in which no single converter controls the operation of the other converters. This is achieved by an arrangement in which each converter attempts to share its current measurement with other converters through an arbitration scheme employed on a data line, with the winning converter providing a defacto current measurement; for example, a maximum or minimum, to the overall arrangement.

16 Claims, 5 Drawing Sheets

(56) References Cited

U.S. PATENT DOCUMENTS

| | | | |
|---|---|---|---|
| 7,325,749 B1* | 2/2008 | Alexander et al. | 236/78 A |
| 7,772,821 B2* | 8/2010 | Liu et al. | 323/283 |
| 2002/0044458 A1 | 4/2002 | Elbanhawy | |
| 2003/0210020 A1 | 11/2003 | Zhang | |
| 2004/0123167 A1 | 6/2004 | Chapuis | |
| 2008/0203985 A1* | 8/2008 | Dong et al. | 323/272 |
| 2008/0309300 A1 | 12/2008 | Liu | |
| 2009/0058379 A1* | 3/2009 | Sreenivas | 323/241 |

OTHER PUBLICATIONS

European Patent Office, International Searching Authority, Partial International Search, Invitation to Pay Fees for International Application No. PCT/EP2010/058419, International Filing Date: Jun. 15, 2010, Sep. 7, 2010, Rijswijk NL, 9 pages.

Search Report Under Section 17 for GB Patent Application No. GB 0910233.6, Date of Search: Oct. 8, 2009, 1 page.

IBM TDB, Balliet, L., et al., "Delay Compensation for CMSA/CD Bit Arbitration Data Bus Access Control", May 1, 1989, 6 pages, ip.com.

Jovanovic, Milan M., et al., "A Novel, Low-Cost Implementation of 'Democratic' Load—Current Sharing of Paralleled Converter Modules", Copyright 1996, 8 pages, IEEE 0885-8993-96505.00.

Rinne, K., et al. "A Novel Digital Single-Wire Quasi-Democratic Stress Share Scheme for Paralleled Switching Converters", Copyright 2010, 8 pages, Powervation, Ltd., Limerick, Ireland, IEEE 978-1-4244-4783-1.

\* cited by examiner

*Prior Art*

DIGITAL STRESS SHARE METHOD

CROSS-REFERENCE TO RELATED APPLICATIONS; BENEFIT CLAIM

This U.S. National Stage Patent Application under 35 U.S.C. §371 claims the benefit of International Patent Appln. No. PCT/EP2010/058419 filed Jun. 15, 2010, which claims priority to British Patent Appln. No. 0910233.6 filed Jun. 15, 2009, and which claims priority to U.S. Provisional Patent Appln. No. 61/262,910 filed Nov. 19, 2009, the entire contents of all of which are hereby incorporated by reference as if fully set forth herein, under 35 U.S.C. §119(e).

RELATED APPLICATIONS

The present application claims the priority of GB0910233.6 filed 15 Jun. 2009 and the priority of U.S. Provisional Application No. 61/262,910 filed 19 Nov. 2009.

FIELD OF THE APPLICATION

The present application relates to power converters, particularly switch mode power converters sharing a load and more particularly to a method of communication and control between such power supplies.

DESCRIPTION

Power converters (SMPCs) are commonplace in electronics systems. As the operating voltage of logic circuitry and loads increase, it becomes more and more difficult to deliver power to the load using a single converter. For this reason and others including the availability of power handling components, component dimensions, reliability and a transient performance) it is common practice to provide the power to the circuit from a plurality of switch mode circuits having their outputs connected in parallel to provide power to a common load. Each switching circuit is said to supply a phase. The phases may be provided with a common controller or individual controllers.

Where there is a plurality of individual controllers, it is important that the individual phases share the work of supplying current to the load so as average out component stresses, and thereby maximize system reliability.

To achieve this, the controllers are arranged in a master-slave configuration with one controller (the master) providing control information to the other controllers (slaves) and receiving measurement information back from the slaves. This information may be referred to generally as stress information as it relates to how the controllers share stress information between them. The present application is directed at where this information is shared in digital form and thus the present application refers to controllers with DSS (Digital Stress Share). A typical configuration is where a single master sends out its local stress (current value) to all the slaves, and the slaves in turn try to match the load of the master by adjusting their output voltage. The control function to implement this is hard to design as the system response depends on the number of slaves responding simultaneously to the masters output. Accordingly, designs have to be conservative for worst-case situations (maximum number of slaves) imposing severe bandwidth limitations. Furthermore, if the master fails, the whole system will fail. The present application is directed at providing an alternative.

SUMMARY

The present application is directed to a master-less arrangement, i.e. a situation where there are multiple slaves but no master. In this load share scheme, the load information of the individual slaves are shared with all other slaves, and the slaves attempt to match the average loading.

To achieve this, it is necessary to share a considerable amount of information between the slaves. However, sharing information of all slaves through a digital interface takes considerable time, and depends on the number of slaves participating in the load-share scheme. Implementing such democratic communications methods using conventional communications techniques such as time-multiplexed or daisy-chain serial or parallel buses are not practical as they would be too slow in the case of serial or too complex in the case of parallel buses. Accordingly, to implement the load share scheme, a novel communications protocol and method has been developed.

Accordingly, a first embodiment provides a PWM controller for controlling a phase in a multi-phase environment. The PWM controller comprises a control circuit for generating control signals for a switching circuit to provide an output voltage. The control circuit provides control signals to operate the switching circuit at a level of stress. A communications circuit is provided which is configured to receive a maximum stress value and a minimum stress value. The control circuit is adapted to adjust the level of stress toward an average of the maximum and minimum values. Suitably, the communications circuit receives and transmits the stress values on a single line. Periodically, the communications circuit may transmit a signal identifying itself to other controllers on this single line. The communications circuit may also periodically provide a status of the controller to other controllers on the single line.

The stress values may be indicative of one or other of a current measurement a temperature measurement or both.

Optionally, the first and second stress signals may be primary stress signals indicative of a first measurement type, for example current and the communications circuit may be further configured to receive secondary stress values, for example temperature. In this arrangement, the secondary stress values may be transmitted less frequently than the primary stress values. The communications circuit of the PWM controller may be configured upon detecting a communication from another controller to attempt to win an arbitration process to communicate. This arbitration process may comprise detecting at each bit in a packet communication whether any other controller is transmitting a higher priority bit and where this is the case, exiting from the arbitration process. The communications circuit of the controller may be configured to synchronise to a predefined pattern of packet types.

In a second embodiment, a PWM controller is provided for controlling a phase in a multi-phase environment. The PWM controller comprises a control circuit for generating control signals for a switching circuit to provide an output voltage and a communications circuit. The control circuit is configured to operate the switching circuit at a level of stress.

The communications circuit is configured for receiving stress data in packets from other PWM controllers and transmitting stress data in packets to other PWM controllers. The controller is adapted to cease transmission of a packet in the event that a substantially simultaneously transmitted packet of another controller has priority. Priority is determined by monitoring each bit in a packet transmitted on a line and ceasing transmission of a packet where a higher priority bit is seen on the line.

The communications circuit mat be configured to receive at least two different values per cycle of stress data. The first value of stress data may be a maximum stress value with the second stress data is a minimum stress value. Suitably, the communications circuit transmits and receives data on a common single line. The communications circuit may be configured to periodically identify itself (i.e. the PWM controller) on the line. There may be a plurality of stress data cycles in a communications cycle. In this arrangement, at least one of the stress data cycles represents a first type of measurement, for example current, and at least one of the stress data cycles represents a second type of measurement, for example temperature. The stress data cycles representing the second type of measurement may be transmitted less frequently than the first type.

In a third embodiment, a controller is provided for controlling a switching circuit providing a phase in a multiphase environment. Suitably, the controller comprises a communications circuit for receiving at least one stress signal, a voltage control loop for controlling the voltage output from the circuit, the voltage control loop being a digital controller operating at a first rate, a current control loop for controlling a phase current by updating a set point of the voltage control loop, the current control loop providing an updated set point to the voltage control loop at a second rate to the first rate, wherein the second rate is slower than the first rate, and a stress control loop receiving the at least one stress signal from the communications circuit and providing a current set point to the current control loop, wherein the current control loop provides an updated set point to the current control loop at a third rate, wherein the third rate is slower than the second rate. Suitably, the communications circuit provides a minimum and maximum stress signals to the stress control loop and the stress control loop averages these and provides an average stress signal to the stress control loop. The stress control loop and the current control loop may operate at substantially the same rate.

In yet another embodiment, a controller is provided for operating a switching circuit in a multi-phase environment where several switching circuits share the provision of an output voltage to a common load, the controller having a voltage control loop for ensuring that the output voltage remains at a set point, a current control loop for adjusting the setpoint of the voltage loop to adjust the share provided by the switching circuit wherein a proportion of the deviation of voltage output is provided as an input to the current control loop. Suitably, the balance between voltage deviation and stress share may be achieved by adjusting the proportion of the output deviation being provided as an input.

DETAILED DESCRIPTION

In the DSS scheme presented herein, a master-less quasi-democratic stress share scheme is introduced. In this scheme, arbitration is employed to ensure that only one or preferably two slaves share their information with all other slaves. The first slave sharing its stress information will be the one with the highest stress. In the preferred embodiment, the slave with the lowest stress will also share its stress information. Knowing the highest stress, individual slaves may adjust their own stress upwards toward the highest stress. Where the lowest stress is also available, the individual slaves may calculate an average stress value (defined as mean between highest and lowest stress) and adjust their stress toward the average stress value. It will be appreciated that in the present application whilst individual devices may be described as slaves, there is no predefined master and that any slave can become a master and share its information if it has the highest or lowest stress.

Using this method a fully predictable timing is ensured, as regardless of how many slaves are connected to the system, a maximum of only two devices (highest stress, and lowest stress) are required to share their information in an alternating fashion. This information is shared with others with low delays, using a single wire for bidirectional serial data transmission. Other advantages and features of the DSS scheme will now be outlined in the more detailed description which follows.

Figure 1:
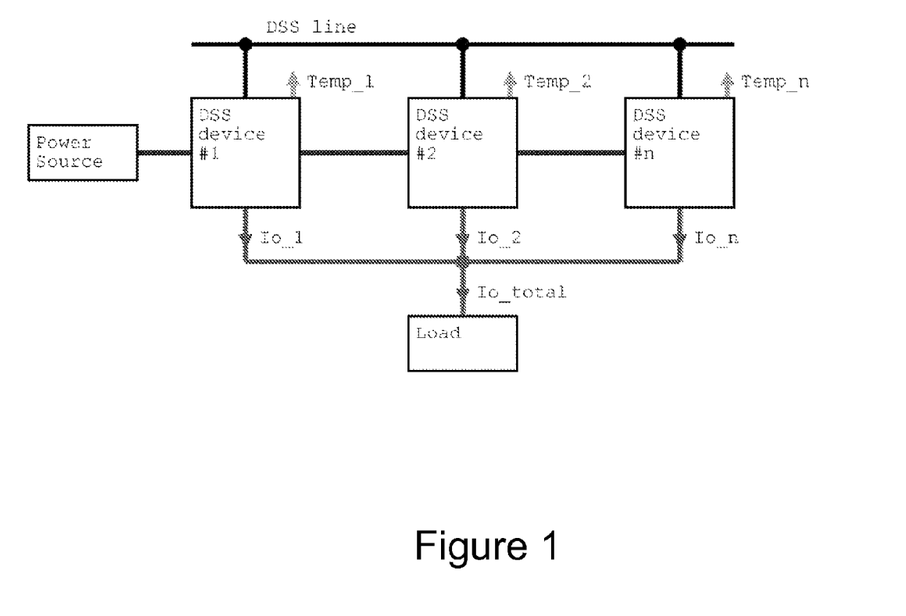
FIG. 1 is an exemplary arrangement of a multi phase schema as provided by the present application.

In particular, the scheme as applied to an exemplary arrangement of a multi phase power conversion system as shown in FIG. 1 with multiple DSS slaves will now be described. In the arrangement, each slave device supplies a phase to a common load. As the slave device supplies power to the load, a measure of the slave devices stress is obtained. For ease of explanation, the description will now follow with respect to a primary stress being an output current measurement with optionally a secondary stress being temperature. It will be appreciated however that use of just temperature stress would also be possible, or a multi stress system including voltages as well, where it would be desirable that the DSS slaves attempt to balance the overall stress.

The slave devices are interconnected through a single-wire DSS bus, for ease of design and implementation. Using information shared on this bus the individual DSS slaves can react in order to share the delivery of power to a common load (not shown).

In order to facilitate stress share, a first slave having the highest stress shares its stress information with the other slaves. Preferably, a second slave having the lowest stress also shares their stress. Output current information is the most dynamic converter variable contributing to device stress and is the primary one chosen for the purpose of indicating stress. However, it is also known to use other indicators and these may be used as secondary indicators. Thus in addition to output current, two slaves (highest, lowest) may also share their temperature stress over DSS bus. Temperature stress is a less dynamic contributor to device stress, and does not need to be transmitted as frequently as output current information. This is discussed in greater detail below.

It is also possible to transmit other information across the bus. Thus in one variation, slaves connected through the DSS may also identify themselves (their device address, their status) sequentially to all other slaves. This information may be used to reduce stress for other system components (e.g. input filter) and may, for example, be utilised to optimise phase interleaving between DSS devices.

The DSS line of the present application is based on asynchronous data transmission. The DSS protocol employed is a quasi-democratic stress share allowing both the highest-stress device as well as the lowest-stress device connected to the line to win arbitration, and transmit its information. As a consequence all devices connected to the DSS line gain knowledge of the highest and lowest stress devices on the line. From this information, each slave device can adjust its controller in order to try to match the average system stress.

In addition to sharing pure stress information, the DSS interface may be more comprehensively exploited. In particular, the DSS interface may allow slaves to share information about their presence and status (using what will be referred to herein as slave information packages). For these slave information packages, all slaves connected to DSS may gain information as to which and how many other slaves are connected through DSS, and an indication about their status.

The DSS system presented herein offers a number of significant advantages over the prior art. Firstly, it can accommodate a large number of devices. There is no need to program or preset the slave devices, it is sufficient to connect them to a common DSS bus. As only the highest and lowest-stress devices win arbitration, the amount of contention for the bus is reduced. Thus the speed of communication is relatively fast in comparison to prior art methods.

In turn, the control functions in the slave devices is relatively straightforward since they gain knowledge of highest and lowest stress devices from devices connected to the DSS line, and adjust their controller in order to try to match the average system stress.

It will be appreciated that as the only information required by an individual slave device to operate as a slave device is the highest and the lowest stress being experienced by the connected slaves generally, that the system provides for hot-plugging\swapping as well having a reasonable tolerance to faults as inactive devices on bus do not disturb DSS system.

Figure 3:
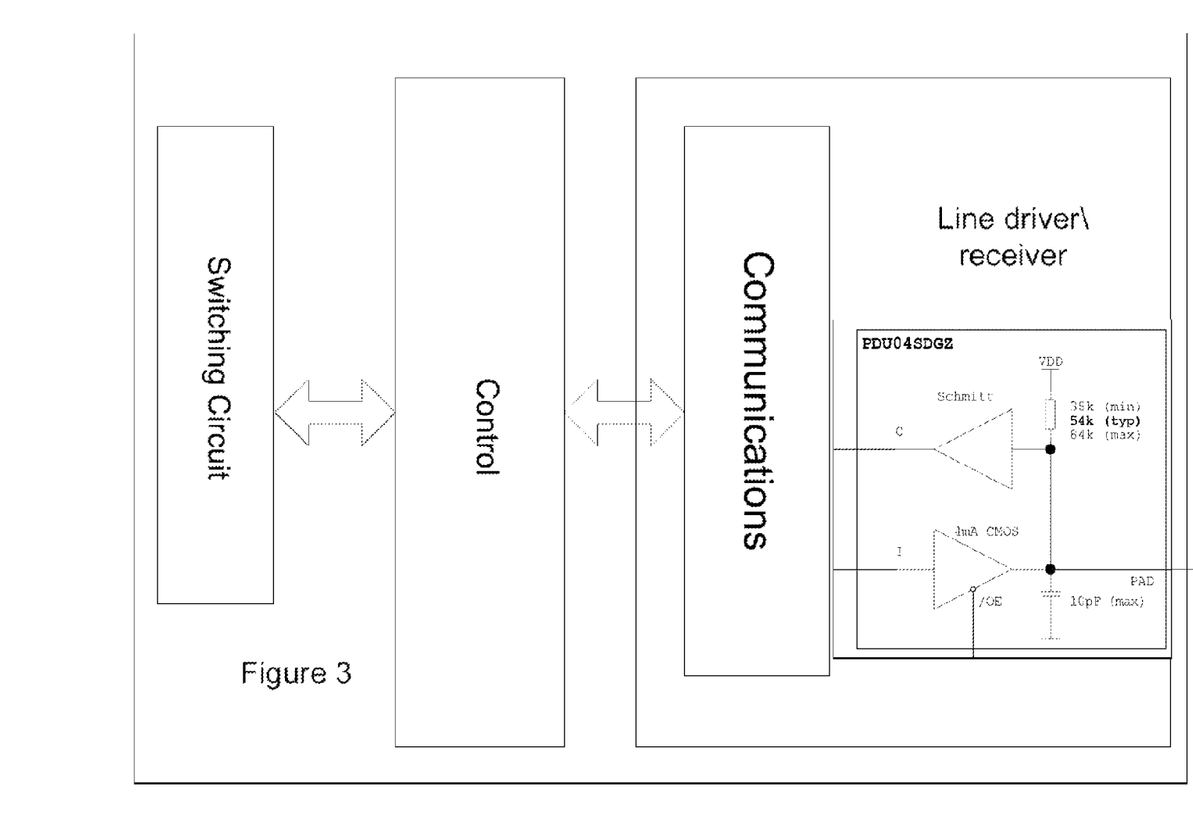
FIG. 3 is an exemplary controller suitable for use in the arrangement of FIG. 1.

An exemplary circuit arrangement for a communications circuit employed by each slave device is shown within FIG. 3. Each slave has an open-drain I/O line with internal pull up resistors which provides a high-noise margin and is insensitive to common-mode noise. For better noise margins, Schmitt-trigger inputs may be employed. Each slave device is configured to operate at the same transmission speed although each slave may monitor for edge transmissions on the line and synchronise their local slave clock for communications accordingly.

Advantageously, as will be explained below each of the slave devices is configured to be fail-safe, whereby in the event of a fault on the DSS line, the slave device may automatically fall-back to autonomous stand-alone mode.

As will be apparent from the detailed discussion of the arbitration process employed, any active DSS device may become the dominant slave and transmit a packet on the line. Moreover, each active slave device may attempt to become the dominant slave as each packet is transmitted. In addition, passive DSS devices may be provided which do not attempt to transmit and may be used overall by a system for monitoring/system debugging. Each active DSS device participating in the stress share scheme may compete to gain control over the line for each DSS packet. Thus each DSS device may attempt to transmit a maximum and minimum packet with its current value. If no other device is present, the DSS device will see its current as being the highest and the lowest value and thus determine that its current is at the average and no adjustment is required.

Figure 2:
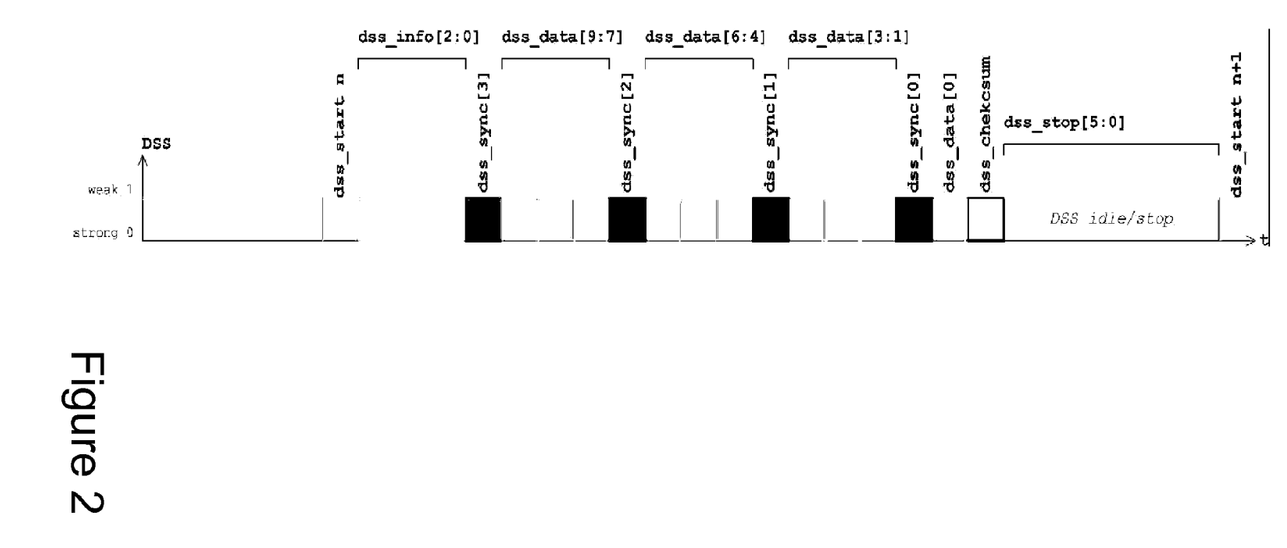
FIG. 2 is an exemplary packet structure for use in the arrangement of FIG. 1.

An exemplary DSS packets structure will now be described before the method of arbitration is discussed, the structure, as shown in FIG. 2, suitably consists of a start bit (dss_start-1 bit), an information block (dss_info[2:0]-3 bit), data block (dss_data[9:0]-10 bit total), four sync bits (1 bit each=4 bits) nested between groups of data bits, a packet checksum bit (dss_checksum-1 bit), and a stop/idle period (dss_stop[6:0]-7 bits) resulting in a total of 25 bits per packet. The first sync bit (dss_sync[3]) is positioned between the information block and the first three data bits, with the second sync bit (dss_sync[2]) positioned after the first three data bits (dss_data[9:7]) but before the next three data bits (dss_data[6:4]) with the third sync bit occurring after these three data bits (dss_data[6:4]). The final sync bit (dss_sync[0]) occurs after the next three data bits (dss_data[3:1]) but before the last and final data bit (dss_data[0]).

The sync bits ensure that the longest unbroken sequence of logic 1's or logic 0's is limited to three bits and thus the elapse of a stop period of 7 bits may be safely detected by all DSS devices. The value of each sync bit is the inverse of the previous bit.

The checksum detects for single bit errors. In the event of a checksum error being detected in a packet by a slave device, the slave device simply ignores the faulty packet.

After the stop period has completed, a new DSS packet may start, initiating a new round of competition for the line, and a new process of arbitration which will now be discussed.

The DSS bus is a single-wire bus (hence it may also be referred to as a DSS line) with one dominant state (logic 0 in the exemplary embodiment) and one weak state (logic 1). After the DSS line has been found to be idle by one or more devices (i.e. after a stop period), a new DSS packet may start.

At the start of each DSS packet (starting with a start bit, followed by info and data blocks etc.), each DSS device actively participating in stress share attempts to gain control over the bus. This process may begin with either one (or even multiple) pulling the DSS line low. All devices connected to the DSS line will recognise this as the start bit of a new packet, and synchronise themselves to this start bit (and each device will also pull the line low). After a small amount of time all DSS devices are now pulling the DSS line low.

After the bit duration has elapsed, all devices continue to the next bit in the packet and transmit the MSB (Most Significant Bit) of their info block. If at any point during the packet transmission, a device wants to transmit a Logic 1, when the line is still being pulled down to Logic 0, the device will understand that it has lost the arbitration process and exit the arbitration process. Thus devices enforcing the dominant state (logic 0) will win the arbitration, and devices trying to emit the weak state (logic 1) will recognise that they have lost arbitration, and will withdraw from any transmission for the rest of the DSS packet. Multiple devices may continue the arbitration process. Note that it is possible for 2 or more devices to emit the same DSS packet, and each will assume that they have won arbitration. No harm is caused by this event, as a valid DSS packet has been transmitted. Input data should suitably be sampled 50% through the bit period.

With the relatively high impedance of the pull-up resistors, it will be appreciated that the response of the DSS line to a change from 0 to 1 will not be instantaneous.

In the exemplary implementation, Logic 0 is the dominant state on the DSS bus. During transmission every DSS device continuously monitors if it has lost arbitration. An abnormal event is assumed if a DSS device attempts to transmit a dominant level (0) but loses arbitration. In the event of this happening, a critical error flag is set within the DSS device. This flag is an indicator for a system fault (e.g. DSS bus permanently stuck at 1). In order to protect the DSS line driver where such a fault is detected by a DSS device, the DSS device may disable its transmitter. The transmitter may remain disabled for a predefined period of time, until a power reset or remain disabled until the error flag has been cleared through a command sent through a separate control interface which may be provided, for example by means of an industry standard PMBUS interface.

The info bloc of the packet identifies the type of DSS packet. Apart from the packets containing the above discussed maximum stress value (DSS_IOMAX) and minimum stress value (DSS_IOMIN), the devices may also be configured to respond to other packet types. However, where a device is not configured to respond to these other packet types, the device may simply ignore them. Each of the various DSS packet types is uniquely identified by the DSS info block. An exemplary DSS info block format is summarised in Table 4.

TABLE 1

DSS Info Blocks

| dss_info [2:0] | DSS Info Type | DSS Info Block |
|---|---|---|
| 000b | n/a | reserved (highest priority, will always win arbitration) |
| 010b | DSS_DEBUG | reserved for system debug |
| 011b | DSS_SLAVE | Slave Encoding C<br>Slave device address (7b, ranging from 0 ... 127 following smbus conventions, and 3b status information) |
| 100b | DSS_TMIN | Temperature Encoding B<br>lowest temperature winning arbitration |
| 101b | DSS_TMAX | Temperature Encoding A<br>highest temperature winning arbitration |
| 110b | DSS_IOMIN | Output Current Encoding B<br>lowest output current winning arbitration |
| 111b | DSS_IOMAX | Output Current Encoding A<br>highest output current winning arbitration |
| Others | n/a | reserved for future use |

Suitably, a DSS device will ignore DSS packets it is not designed for to handle. For example, a DSS device only designed to handle DSS_IOMIN and DSS_IOMAX packets ignores all other types of DSS packets. Such a device may still participate in the arbitration process, but will lose arbitration during such higher priority DSS packets it cannot handle.

It may be noted that—as far as the DSS interface side (i.e. the DSS line) is concerned—the current/temperature encoding scheme should employ linear/offset binary rather than conventional two's complement binary in order for arbitration to work. The reason for this is that in the event that the output current was negative on a particular DSS device, using two's complement its output would have its first bit (sign bit) as a 1 and would thus win arbitration over a device with a positive current (clearly undesirable). Note that although the device logic may be different to the transmitted data which is 1's complement for maximum values as the dominant logic state for the arbitration process is 0. The use of 0 as the dominant logic state was chosen as it may be easily implemented using a standard open drain with pull-up resistor. It will be appreciated however that with appropriate changes, a configuration where a 1 was the dominant state may also be implemented.

Encoding schemes for the data payload of various types of packets (as dictated by their Info_Type are summarised in Table 5.

| Encoding | DSS Info Type | Data transmitted dss_data[9:0] |
|---|---|---|
| A | DSS_IOMAX | dss_data[9:0] = ~dss_dev_io[9:0] (i.e. 1's complement) |
| A | DSS_TMAX | dss_data[9:0] = ~dss_dev_temp[9:0] (i.e. 1's complement) |
| B | DSS_IOMIN | dss_data[9:0] = dss_dev_io[9:0] |
| B | DSS_TMIN | dss_data[9:0] = dss_dev_temp[9:0] |

-continued

| Encoding | DSS Info Type | Data transmitted dss_data[9:0] |
|---|---|---|
| C | DSS_SLAVE | dss_data[9:0] = {dss_dev_addr[6:0], dss_dev_status[2:0]} |

It will be appreciated that the maximum values use 1's complement to ensure the maximum value always wins arbitration, whereas the minimum values do not use 1's complement to ensure the lowest value wins arbitration.

Devices participating in the DSS stress share scheme periodically cycle through the various DSS packet types sent out on the line. An exemplary standard DSS packet cycle consists of either two or three DSS packets as shown in table 3 below. In "normal" DSS_IOxxx cycles, DSS_IOMAX and DSS_IOMIN packets are transmitted sequentially. Output current is the most dynamic quantity which needs to be exchanged over DSS, and DSS_IOxxx packets are therefore transmitted most frequently.

Device slave status and device temperature are comparatively slow moving quantities. Therefore, packets relating to device slave status (DSS_SLAVE), and device temperature (DSS_TMAX and DSS_TMIN) need to be transmitted much less frequently. The choice depends on system factors, but for typical systems it is sufficient to transmit device slave status, and device temperature each 256th DSS cycle. The following table summarises exemplary DSS cycles, and their respective DSS Packets for the particular cycle.

TABLE 3

DSS Cycles and Packet Sequences

| DSS Cycle | DSS Packets Transmitted in DSS Cycle | Comments |
|---|---|---|
| 0 | sequence: DSS_IOMAX, DSS_IOMIN | DSS_IOxxx cycle |
| 1 | sequence: DSS_IOMAX, DSS_IOMIN | DSS_IOxxx cycle |
| ... | sequence: DSS_IOMAX, DSS_IOMIN | DSS_IOxxx cycle |
| 127 | sequence: DSS_IOMAX, DSS_IOMIN, DSS_SLAVE | DSS_SLAVE cycle |
| ... | sequence: DSS_IOMAX, DSS_IOMIN | DSS_IOxxx cycle |
| 255 | sequence: DSS_IOMAX, DSS_IOMIN, DSS_TMAX | DSS_TMAX cycle |
| 256 | sequence: DSS_IOMAX, DSS_IOMIN | DSS_IOxxx cycle |
| 257 | sequence: DSS_IOMAX, DSS_IOMIN | DSS_IOxxx cycle |
| ... | sequence: DSS_IOMAX, DSS_IOMIN | DSS_IOxxx cycle |
| 383 (=256 + 127) | sequence: DSS_IOMAX, DSS_IOMIN, DSS_SLAVE | DSS_SLAVE cycle |
| ... | sequence: DSS_IOMAX, DSS_IOMIN | DSS_IOxxx cycle |
| 511 | sequence: DSS_IOMAX, DSS_IOMIN, DSS_TMIN | DSS_TMIX cycle |
| 512 → | back to DSS Cycle #0 | DSS_IOxxx cycle |
| 0 | sequence: DSS_IOMAX, DSS_IOMIN | |

A number of exemplary system scenarios are possible:

Scenario A: Fully-featured DSS system with all devices supporting all types of DSS info blocks. Sequence as described above, and all devices share minimum/maximum current and temperature information, as well as DSS slave status.

Scenario B: Partial DSS system with some (1 or more) devices supporting all DSS info blocks, and others only supporting a subset (e.g. only DSS_IOMAX and DSS_IOMIN). The fully-featured DSS devices will periodically succeed to transmit DSS_TMAX and DSS_TMIN blocks (which will be ignored by the partly-featured DSS devices).

Scenario C: Semi-democratic DSS current share systems where all connected DSS devices only support DSS_IOMAX and DSS_IOMIN packets.

Scenario D: Master-Slave DSS current share systems where DSS devices only support DSS_IOMAX packets. Device with highest output current will always win arbitration. Although supported, this mode would not generally be recommended as system performance (i.e. control system performance) may be adversely affected.

Although the primary purpose of the DSS bus is to share stress information, it may optionally be used for the transfer of additional information to further enhance system performance, reduce system stress, and thus increase system reliability.

DSS slave packets (DSS_SLAVE) are an example of this. These packets allow individual DSS slaves to identify themselves and optionally also their status to other DSS slaves connected to the DSS bus. By individual slaves sharing this information, DSS slaves can generally gather information as to which and how many other DSS slaves are connected to the DSS bus and their respective status. This additional DSS information may be useful for a number of reasons including for example phase-alignment and inter-slave phase dropping.

In a power system with multiple slaves sharing the overall stress, it is generally understood to be beneficial (for example to minimise voltage ripple) if the pulse-width-modulators (PWMs) of the DSS slaves are phase-aligned. For optimum system performance, the desired phase-alignment is 360°/n (where n is the total number of output phases in the system). As an example, assuming three DSS slaves with one output power phase each, a phase alignment of 360°/3=120° between slaves may be desirable. To achieve this, a first one of the three DSS slaves is elected as the phase master (through one of many possible methods, e.g. the one slave configured as synchronisation master, or the one slave with the lowest DSS device address, or otherwise). The phase master would set the reference phase of 0° and the other two slaves would assume phase alignments of 120° and 240° relative to the phase master. The transmission of DSS_SLAVE packets assists DSS slaves to determine the total number of slaves connected to DSS, and subsequently determine the optimum phase relationship to the reference phase. For example, if the slave with the lowest DSS address is at a phase of 0° that the slave with the next lowest DSS address may set itself to a phase of 120° and the remaining slave may set its phase to 240° relative to the first phase.

A power system may further benefit from inter-slave output power phase dropping. For example: As the total system output current decreases, individual DSS slaves may drop their own output power phase(s) based on DSS information gathered through DSS_SLAVE packets from other DSS slaves. At low output currents, the number of active phases may then be dropped down to a minimum (of one), while still providing a regulated output voltage. The system can then be designed such that the efficiency is maximised over the full range of system output currents.

It has been discussed generally above how individual DSS slaves can benefit from knowing as to which and how many DSS slaves it works in conjunction with, and their respective status (the status typically summarises the power status a particular DSS slave is in, e.g. the number of operational phases).

Compared to DSS stress packets (DSS_IOMAX, DSS_IOMIN, TMAX, TMIN), DSS slave packets (DSS_SLAVE) work differently. One has to ensure that all DSS slaves, not just the one with highest or lowest stress, periodically and sequentially send out DSS slave packets. This is achieved using a subsidiary DSS arbitration scheme which will now be described.

This will now be described with reference to the exemplary DSS cycle period set forth in Table 3 which consists of 512 DSS cycles. 508 of these DSS cycles carry 2 DSS packets, and 4 carry 3 DSS packets. Thus a total number of 508*2+4*3=1028 DSS packets are transmitted per overall DSS cycle period. Of this total, two DSS cycles (in the exemplary cycle numbers 127 and 383) are assigned to carry a DSS_SLAVE packet. Each salve device is aware of the overall packet, thus by detecting the presence of particular packets, the individual devices can synchronise their transmissions into the cycle. For example, when a device detects an DSS_TMAX cycle, it will understand that it is at cycle number 255.

Every time a DSS_SLAVE packet is scheduled to be transmitted, all DSS slaves will compete for the bus, using the usual arbitration scheme. As '0' is the dominant state on the DSS line, the DSS slave with the lowest device address will win arbitration. Once a particular DSS slave has won arbitration for its DSS packet, it will attempt to transmit a special reserved DSS slave packet at the next time a DSS slave packet is scheduled for transmission.

The reserved (or "vacant") DSS slave packet uses the weakest DSS device address (decimal 127=binary 1111111) and device status (decimal 7=binary 111). This encoding ensures that the reserved DSS slave packet will never win arbitration against a standard DSS slave packet.

However, once all DSS slaves have managed to transmit their normal DSS slave packet, the reserved DSS slave packet will be transmitted successfully (by one or more devices simultaneously). The DSS slaves recognise the reception of the reserved DSS slave packet, and thus know that all DSS slaves have managed to transmit their DSS slave packets.

Thus DSS slaves in the system, which have received the slave packets intact, know:
  which DSS slaves are present (identified by their device address)
  how many DSS slaves are present (identified by the number of different device addresses)
  the status of each of the present DSS slaves The DSS slaves now also know that the DSS slave packet cycle is completed, and a new cycle can start. Each of the DSS slaves can now compete for the DSS bus to transmit their "normal" DSS slave packet.

Based on the acquired knowledge as to how many DSS slaves are present, individual DSS slaves may take higher level actions as discussed before (adjust their phase alignment relative to the synchronisation and phase master (DSS device with phase at zero)).

As an example, consider a system consisting of 3 DSS slaves with addresses 10, 99, and 125 (These may be pre-programmed into the devices or acquired by an alternative control interface). Each full DSS cycle period consists of 512 DSS cycles, each consisting of 2 or 3 packets. Hence, a full DSS cycle period consists of a total 508*2+4*3=1028 packets and has a duration of 51.4 ms. During one full DSS cycle period, two DSS slaves get a chance to transmit DSS slave packets (in cycles #127 and #383). The DSS slave packets will be transmitted following normal DSS arbitration rules, i.e. the DSS slave with the lowest address will win arbitration. Hence, in above example, DSS slave with address 10 will win the first arbitration round. Once DSS slave #10 has transmitted its DSS slave packet, DSS slave #10 will only participate in arbitration for the reserved DSS slave cycle. A full DSS slave cycle is complete as soon as all DSS slaves receive the reserved DSS slave packet, and a new DSS slave cycle can start.

In the given example, the sequence then is

DSS slave #10 will win arbitration, and will transmit a slave packet in cycle #127 (DSS cycle period 1).

DSS slave #99 will win arbitration over #125 and DSS slave #10 which attempts to transmit a reserved packet. Thus will successfully transmit a slave packet in cycle #383 (DSS cycle period 1)

Similarly, as the last slave device DSS slave #125 will win arbitration in cycle #127 (DSS cycle period 2) and transmit a slave packet.

As all DSS devices have now transmitted a slave packet, all DSS slaves will attempt to transmit the reserved DSS slave packet in cycle #383 (DSS cycle period 2), and one (or more) will succeed to do so. All DSS slaves receive the reserved DSS slave packet, and thus now know that the DSS slave packet cycle is complete, and that three DSS slaves (with addresses #10, #99 and #125) are present on the line.

A fresh DSS slave packet cycle may then start, in which

DSS slave #10 will win arbitration, and will transmit a slave packet in cycle #127 (DSS cycle period 3)

and so forth . . . .

The advantage of this is that if a DSS device withdraws from or enters upon the line, the other devices will become aware of the change and thus may alter their configurations. Thus in the case, where the number of slave devices switches from 2 to 3, the devices may reduce their relative phase offset from 180° down to 120°.

Figure 4:
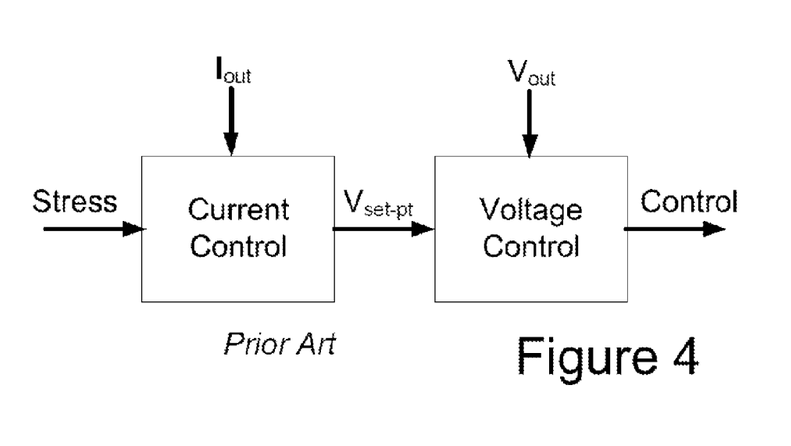
FIG. 4 is an exemplary structure of a control structure employed in a controller of FIG. 3.

One of the advantages of the present application is that changes may be distributed quickly around the individual controllers. However, if these changes were applied in accordance with control techniques employed in the prior art, the advantage derived from the improved rate of distributing information might be negated. This may best be explained by the exemplary structure shown in FIG. 4 in which a stress signal distributed by a master is received at a controller. This stress signal is used as a set-pt in an outer current loop which in turn sets the set-pt of an inner voltage control loop. A problem with this arrangement is that the bandwidth of the outer control loop is restricted to avoid introducing instability into the system. The problem with this approach is that whilst stability is ensured, the overall slew rate in the system is degraded. Thus in a scenario where the load changes suddenly, the rate of response of individual controllers is reduced significantly. Whilst, this may be acceptable with certain loads it is undesirable within many circuits where the circuitry may cease to operate correctly or introduce transient errors which are unpredictable.

Figure 5:
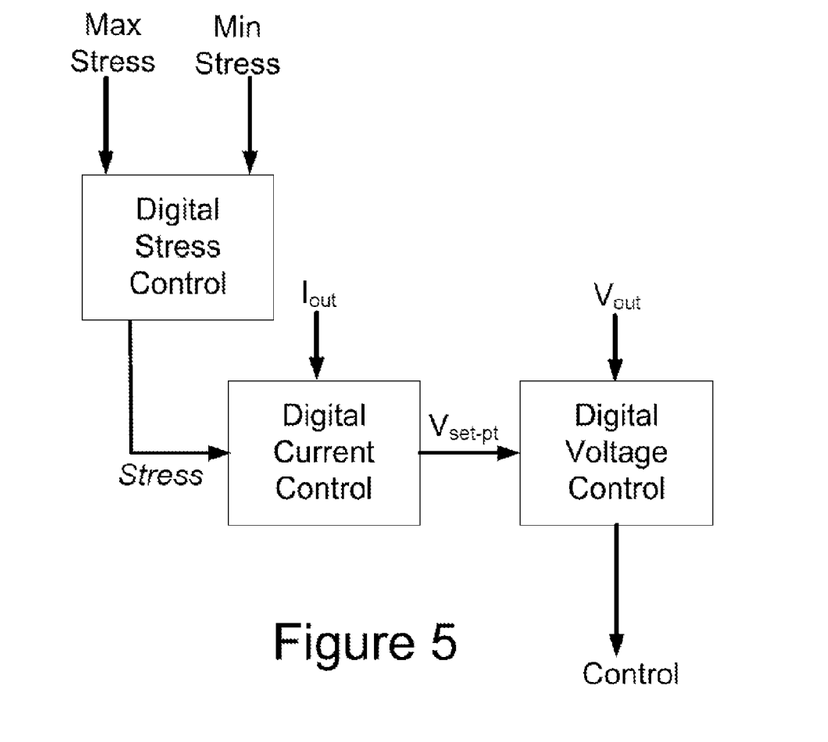
FIG. 5 is an exemplary structure of a control structure of the present application

The present application provides a control arrangement which whilst ensuring that instability is reduced maximises the slew rate of the power controllers. This arrangement, as shown in FIG. 5, comprises three digital controllers each. These controllers comprise a primary controller which comprises a voltage control loop for maintaining an output voltage at a set point, for example. A secondary controller is a current control loop which adjusts the voltage set-pt of the voltage controller to increase\decrease the effective output current contribution from the controller. A benefit over the prior art is that this current control loop is relatively fast. In a practical implementation, the assignee of the present application, has implemented a controller with a speed of operation for the voltage control loop at a rate of approximately 1 MHz, thus the control signals from this control loop are updated approximately 1 million times per second. In contrast, in the practical implementation the current control loop operates at a slower speed of 20 kHz A third controller is responsive to the incoming stress signals and this controller whilst possibly operating close to or at the same speed as the current control loop only updates the value provided to the current control loop at a lower rate, e.g. every $16^{th}$ cycle. It should be appreciated that whilst the rate at which the value is provided may be lower, the response is not limited since the control loop bandwidth is not restricted for stability reasons rather the rate at which the input is provided to the control loop is restricted. Thus, if a step change in the stress signal were considered, whilst a delay may be introduced in providing this changed stress value to current control loop by virtue of the slower output rate, the speed of response of the current loop once it receives this value is not bandwidth limited. In contrast, a prior art system might have a control bandwidth in the order of 10 Hz in order to reduce interaction and maintain stability, limiting the control response to stress changes.

Figure 6:
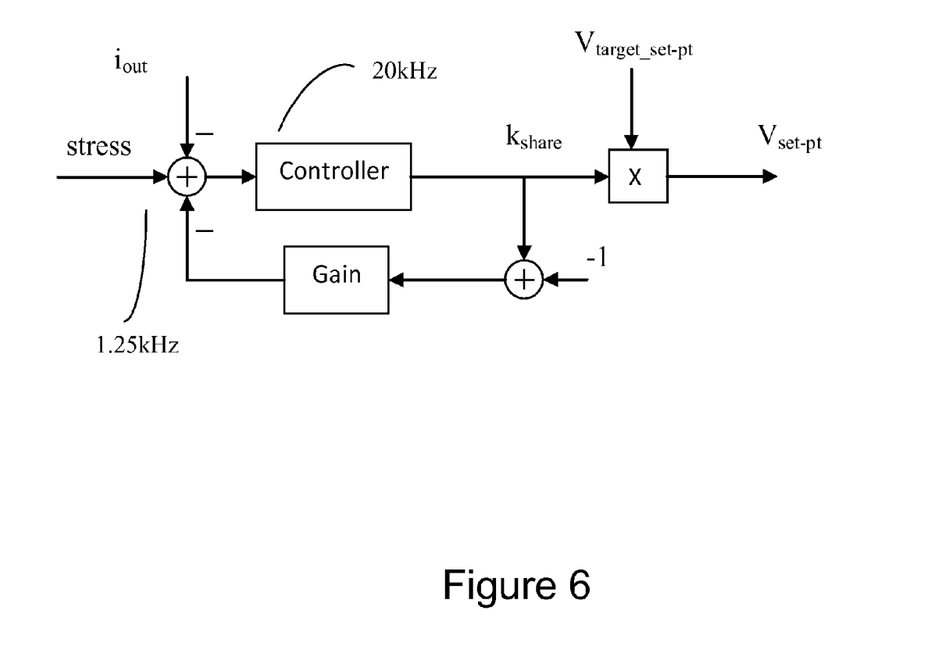
FIG. 6 is an exemplary structure of a current control structure employed in a controller of FIG. 5

As the current loop is the outer controller it necessarily must alter the voltage setpoint of the voltage controller to share stresses. However, the voltage setpoint may also deviate from the required voltage setpoint unnecessarily, sharing stresses at a voltage away from required voltage setpoint. This is a particular problem with prior art schemes. The current controller of the present application addresses this problem by incorporating feedback of the voltage setpoint deviation into the current controller (kshare in FIG. 6), causing the controller to return to the required voltage setpoint once stress sharing has been achieved.

The balance between allowed voltage deviation and stress sharing is achieved by proper setting of the feedback gain.

The invention claimed is:

1. A PWM controller for controlling a phase in a multiphase environment, the PWM controller comprising:
a control circuit for generating control signals for a switching circuit to provide an output voltage, the control circuit providing control signals to operate the switching circuit at a level of stress,
a communications circuit configured to receive a maximum stress value and a minimum stress value on a single line,
wherein the control circuit is adapted to adjust the level of stress toward an average of the maximum and minimum values.

2. A PWM controller according to claim 1, wherein the communications circuit is configured to transmit the stress value for the PWM controller on the single line.

3. A PWM controller according to claim 1, wherein the communications circuit periodically transmits a signal identifying the PWM controller to other controllers on the single line.

4. A PWM controller according to claim 3, wherein the communications circuit periodically provides a controller status for the PWM controller to other controllers on the single line.

5. A PWM controller according to claim 1, wherein the stress values comprise stress signals indicative of a current measurement.

6. A PWM controller according to claim 1, wherein the stress values comprise stress signals indicative of a temperature measurement.

7. A PWM controller according to claim 1, wherein the maximum and minimum stress signals are primary stress signals indicative of a first measurement type.

8. A PWM controller according to claim 7, wherein the communications circuit is further configured to receive secondary stress values.

9. A PWM controller according to claim 8, wherein the secondary stress values are transmitted less frequently to the primary stress values.

10. A PWM controller according to claim 1, wherein the communications circuit is configured upon detecting a communication from another controller to attempt to win an arbitration process to communicate.

11. A PWM controller according to claim 10, wherein the arbitration process comprises detecting at each bit in a packet communication whether any other controller is transmitting a higher priority bit and where this is the case, exiting from the arbitration process.

12. A PWM controller according to claim 1, wherein the controller is configured to synchronize to a predefined pattern of packet types.

13. A PWM controller according to claim 1,
wherein the communications circuit is configured for receiving stress data in packets from other PWM controllers and transmitting stress data in packets to other PWM controllers, wherein the controller is adapted to cease transmission of a packet in the event that a substantially simultaneously transmitted packet of another controller has priority,
wherein the communications circuit is configured to receiving at least two different values per cycle of stress data.

14. A PWM controller according to claim 13, wherein the communications circuit determines priority by monitoring each bit in a packet transmitted on a line and ceasing transmission of a packet where a higher priority bit is seen on the line.

15. A PWM controller according to claim 13, wherein the communications circuit is configured to periodically identify itself on the line.

16. A PWM controller according to claim 13, wherein there are a plurality of stress data cycles in a communications cycle.

* * * * *